April 12, 1938.     H. WILD     2,113,970
STEREOTOPOGRAPHICAL PLOTTING APPARATUS WITH STEREOSCOPIC VISUAL SYSTEM
Filed March 6, 1936     2 Sheets-Sheet 1
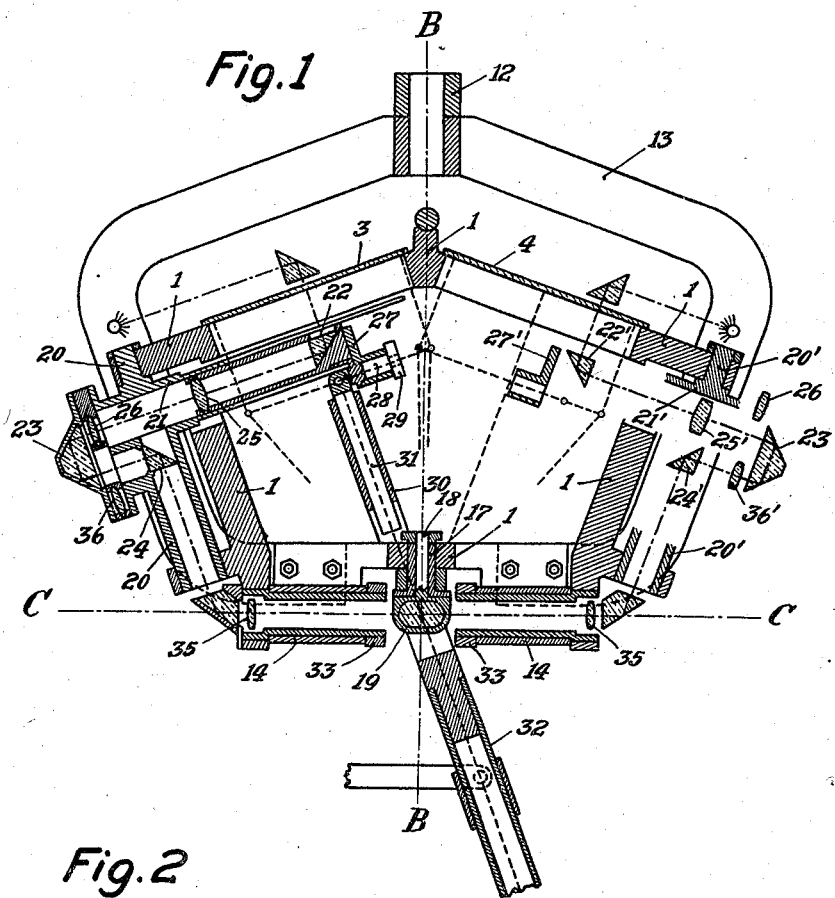
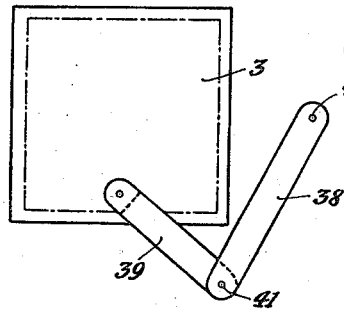
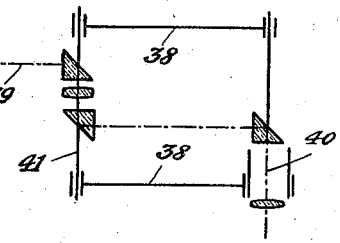
Inventor: Heinrich Wild April 12, 1938.  H. WILD  2,113,970
STEREOTOPOGRAPHICAL PLOTTING APPARATUS WITH STEREOSCOPIC VISUAL SYSTEM
Filed March 6, 1936  2 Sheets-Sheet 2

Inventor: Heinrich Wild

Patented Apr. 12, 1938

2,113,970

UNITED STATES PATENT OFFICE 2,113,970

STEREOTOPOGRAPHICAL PLOTTING APPARATUS WITH STEREOSCOPIC VISUAL SYSTEM

Heinrich Wild, Zurich, Switzerland, assignor to Henry Wild Surveying Instruments Supply Co., Ltd., Heerbrugg, Switzerland Application March 6, 1936, Serial No. 67,496
In Germany February 17, 1934

12 Claims. (Cl. 33—20)

This invention relates to a mapping or plotting apparatus of the stereophotogrammetric type possessing a stereoscopic visual system, guides for the object—and the image space and plate carriers which latter, although remaining stationary during plotting, are all-around and on all sides adjustable; said apparatus containing on each half of said visual system a movable arm with a variable optical system one end of which is connected to the end of the image space guide by way of an articulated joint and moves in a plane corresponding, relative to the pole of the image space guide, to the image plane and the other end of which is mounted on the plate carrier.

Plotting apparatus defining the direction of the guides in space not by way and means of Koppe's system but by means of image space guides which with their ends move in the "image plane" are known to the art. Plotting with the help of such apparatus is effected by the image space guides moving the plates in the latters' own plane and past the stationary visual system. The following advantage is ascribed to such a design: that it represent the most simple form of optical composition, which assertion no doubt holds true for plotting in the normal case. As soon as, however, we have to plot from photographs the optical axes of which were taken at random, substantial complications in the mechanics of the optical system arise with such apparatus too and on top of these there is added the following fundamental disadvantage inherent to such a system, that the relatively large plates are by force subjected to movements corresponding in their extent to the plates' own size and whereby their orientation (swing) must be preserved as accurately as the accuracy of measurement is calling for. Such a design therefore calls for very large dimensions and would lead to great difficulties of a mechanical and optical nature if it were further developed to an apparatus for mapping from photographs of so-called multiple cameras.

The above mentioned disadvantages are eliminated with the aid of the present invention by holding the photographic plates immovable and by aligning the end of a movable arm of the visual system onto the image which, relative to its position, corresponds to the direction of the guide lever.

Said movable arm for this purpose is equipped with an optical system or projection variable in itself and so adapted as to produce a sharply defined image of each point of the photography pointed at by the image space guide at the mark which latter is located within the immovable part of the visual system, whereby the rotations of the image which appear within the movable arm are counter-balanced by suitable means acting in the opposite sense.

The differences of distance between the various points of the image and the fixed mark may be transferred to the optical system in various ways, i. e. by adapting the movable arm in the form of an optical articulated double-joint arm one end of which is connected to the end of the image space guide by way of an articulated joint, whereby the whole arm swings about an axis located on the plate carrier outside the image plane and at right angles to the latter.

Again, the movable arm may be designed and equipped in such a way as to give the variable optical system a double objective lens between the two parts of which the rays pass parallel which latter serves the purpose of taking up said differences of distance.

In both latter cases the rotations of the image may be counter-balanced e. g. by arranging the reflecting parts according to the principle of the rhombic prism.

Apart from these designs of the movable arm yet others are possible, especially such in which the movable arm does not swing about an axis (polar design) but in which the differences of distance are taken up by an orthogonal variable system of mirrors. A parallel path of rays e. g. also may be replaced by inserting a prism deflecting the latter for 180° which moves with but half the speed and thus equalizes the differences of distance.

In all these cases it is advisable for certain tasks to provide for lens-switches in the path of rays which give pictures or images of different size at the fixed mark.

An especially advantageous design of that part of the stereoscopic visual system which remains stationary during the plotting or mapping results from having the rays pass through the axes and particularly by providing a mirror at the pole of the image space guide in which case the latter is carried past and beside said mirror.

The design of a plotting apparatus made possible by the present invention is particularly well suited for the plotting from pictures of multiple cameras, in which case the plate carriers are adapted as multiple carriers, whereby a movable arm is provided for each plate which may, as desired, be coupled with the common image space guide and whereby the paths of rays of all optical systems of a multiple plate carrier are influenced in such a way as to direct them onto a mirror situated at the pole of the image space guide.

A further development of the apparatus, especially with regard to the conjunction of successive photographs, is attained by adapting the axes about which the plate carriers are tilted, swung and put in convergence in such a way that each of the two axes of swing is in a plane which is at right angles to the common axis of tilt. In this latter case each swing-bow is equipped, at the elevation of the axis of tilt, with two bearings for the axis of convergence about which the plate carrier may be set into convergency. With such a design then it is possible to accurately reset all settings which have been ascertained for the one side (and which also are valid for the adjustment of the successive photograph) on the other side without any further computation (for the succeeding photograph).

For quickly bringing the stereoscopic model into its correct position relative to the three-dimensional system of co-ordinates embodied in the main frame of the apparatus, the common axis of tilt may be rotatively mounted in a fork-like bearing which in its turn may be set about a main axis embodied in the main frame.

If we give to the object space guides a normally vertical position, i. e. so that they extend in a downward sense, we advantageously may arrange the main axis as a perpendicular hanging-axis on a bridge, which latter is bow-shaped in plan, is at right angles to the direction of view and is attached to the main frame.

The tilt-levers, i. e. those parts which can be rotated about the axes of tilt and which contain the axis of swing, are suitably adapted in such a way as to enable one to mount them cross-wise superimposed onto the axis of tilt and to equip each of them with two bearings for the appurtenant axis of swing between which the plate carriers—which latter yet have to be put in convergence—are situated. One each of said pairs of bearings for the axes of swing then is located in the vicinity of the mirror at the pole of the image space guide.

The accompanying drawings show two examples of design embodying the features mentioned above, in which—

Fig. 1 shows a section through a double-plate carrier with the axis of swing and of convergence;

Fig. 2 and Fig. 3 are schematical representations for another design of the movable arm of the visual system;

Figure 4:
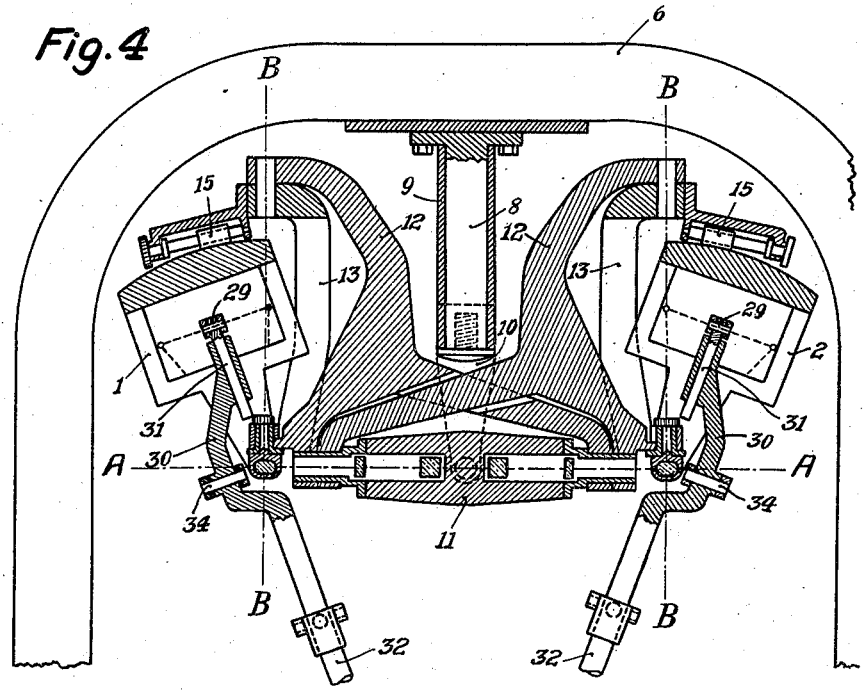

Fig. 4, a section through the axis of tilt of the apparatus; and

Figure 5:
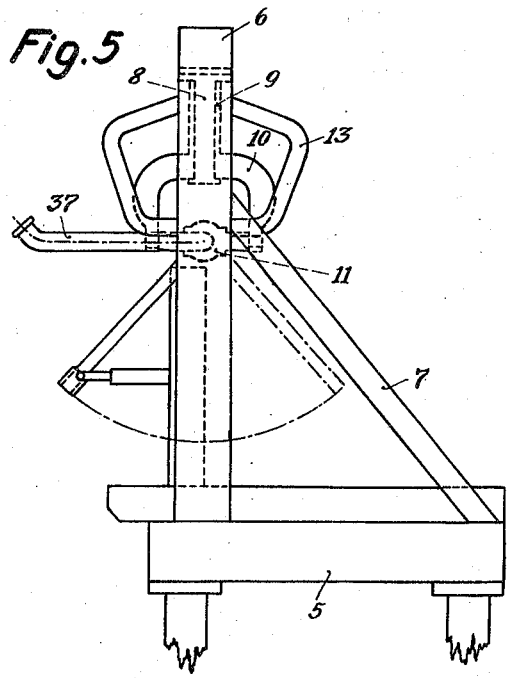

Fig. 5, a schematical side-view of the whole apparatus.

A—A denotes the axis of tilt; B—B that of swing and C—C that of convergence. The apparatus possesses two double-plate carriers 1 and 2 which contain two stereoscopic pairs of photographic plates 3 and 4 from which the plotting is to be done. One must be able to set said carriers and adjust them in such a way as to give each of them that tilt, swing and degree of convergence which the pertaining plates occupied, relative to each other, during their individual exposures. This requirement is met by the following arrangement: A bridge 6, bow-shaped in plan, is mounted on a main frame 5 held in place by braces 7. A vertical axle 8 carrying a rotatively mounted jacket 9 is fixed to said bridge. Said jacket at its lower end carries a fork 10 in which the body 11 of the tilt axis is mounted rotatively about the main axis of the apparatus. On said member 11 two independent tilt-levers 12 are mounted rotatively about the axis of tilt A—A. In each of said levers 12 a swing-bow 13 is mounted rotatively about the axis of swing B—B and each of said bows carries an axle-piece 14 pertaining to the axis of convergence C—C. Each of said plate carriers is for itself rotatively mounted on one of said axle-pieces 14 and thus may be rotated about their pertaining axis of convergence. For setting said carriers relative to their axis of convergence adjusting devices 15 are provided. The apparatus furthermore is provided with setting and adjusting devices for the swing-bows 13 and the tilt-levers 12 which, however, are not shown in the drawings. By adjusting said carriers relative to their axis of convergence the plate pairs are given their correct convergence, by setting the swing-bows 13 true relative to their axes of swing the plates receive their correct swing and by adjusting the tilt-levers 12 relative to the axis of tilt the plates are given their correct tilt.

Fig. 1 shows the two photographic plates 3 and 4 of a stereoscopic pair inserted into the double-plate carrier 1 which latter is revolvably mounted in the axle-piece 14 fastened to the swing-bow 13. Said part 14 carries in its center a jacket 17 pertaining to the axis of swing which in its turn contains the mirror-axis 18. A mirror 19 deflects the rays out of the hollow axle of convergence into the hollow axle of tilt. For this purpose said mirror is connected with said two axles by a parallelogram or the like so that said jacket 17 follows the swing with half the angle. The lower disk of said member 17 is provided with two stops set at right angles to each other and the mirror 19, according to which one of said stops it is abutting against, points toward one or the other half of the hollow axle of convergence.

The double-plate carrier 1 on both sides is equipped with two bearings for the shafts 20 and 20' of the movable arms 21 and 21' of the visual system. Said arms each contain a variable optical system consisting of the prisms 22, 23 and 24 or, respectively, 22', 23' and 24' and the lenses 25 and 26 or, respectively, 25' and 26'. The lens 25 or 25' is rigidly connected to the prism 22 or 22' by means of a tube. To said tube the bearing 27 or 27' of the articulated joint is attached in such a manner as to enable one to shift it for relatively short distances at right angles to the plane of the plate 3 or, respectively, for the purpose of adjusting the focal length. Pivot 28 may be plugged into either of these bearings 27 or 27' and secured by means of the nut 29. Said pivot is connected to the end of another pivot 31 by way of an articulated joint and said latter pivot is sliding within the image space guide 30. The latter guide is rigidly connected with the object space guide 32. The image space guide 30 is mounted in a Cardan suspension in bearings 33 and 34 which lie at right angles to each other. If said latter guide rotates in the bearing 33, which contains the second bearing 34, the movable arm 21 or, respectively, 21' with the axle 20 or, respectively 20' also rotates. If said guide, on the other hand, rotates in the bearing 34, the tube with the prism 22 or, respectively, 22' and the lens 25 or, respectively, 25' slides within the movable arm 21'. The rays of light pass parallel between the lenses 25 and 26 or, respectively, 25' and 26' so that for the lens 26 or, respectively, 26' the depth or distance of the object does not change, said latter lens thus producing a sharply defined image of each and any observed point on plate 3 or, respectively, 4 at the mark 35 or, respectively, 35'. If we choose another degree of magnification for this picture, the mounting of lens 26 or, respectively, 26' is pulled up and a substitute lens 36 or, respectively, 36' moves into the path of rays, as indicated in the right half of Fig. 1. For better illustrating the path of rays the mountings for the optics on the right hand half of Fig. 1 have been omitted. The limits of setting are indicated in Fig. 1 by dotted lines and, furthermore, there is the source of illumination indicated above plates 3 and 4. A journal is inserted on each side of said axle-piece 14 about which, on the one hand, the double-plate carrier 1 and, on the other hand, the bearing 33 of the image space guide 30 rotates. In said journals the carriers for the marks 35 and, respectively, 35', which latter are designed as convergent lenses, are rotatively mounted. The rays pass from each of said marks into the hollow body of the axis of tilt by way of the mirror 19 and then into an eyepiece-tube 37. A device for counter-balancing the rotation of the image also may be provided for in the hollow body of the axis of tilt. The double-plate carrier 2 and its visual system is corresponding in all details to carrier 1 and its visual system.

The variation in the design of the movable arm of the visual system shown schematically in Figs. 2 and 3 illustrates a movable arm consisting of two tube-shaped members 38 and 39 through which the rays pass. Member 38 is rotative about an axis 40 which is at right angles to the plane of plate 3; said axis corresponding to the axis 20 or, respectively, 20' of the above described design. Said member 38 at its free end carries a hollow axle 41 which is parallel to said axis 40. For the transfer of the rays two prisms and—should it be required—a lens is mounted in said axle 41.

What I claim and wish to secure by Letters Patent is:

1. A stereotopographical plotting apparatus with stereoscopic visual system, object space guides and image space guides and plate carriers all-around adjustable which latter, however, remain stationary during the plotting operation; each half of said visual system containing a movable arm in association with a variable optical system or projection, one end of said arm being connected with the end of said image space guide by means of an articulated joint and moving in a plane which, relative to the pole of the image space guide, corresponds to the image-plane and the other end of said movable arm being mounted on said plate carrier.

2. A plotting apparatus according to claim 1, said movable arm containing a variable optical system, said system producing a real image of any spot in the stereoscopic model aimed at by the image space guide, an optical mark in the stationary part of said visual system, said real image appearing at said mark, the differences of depth or distance between the various points of the stereoscopic model and the said stationary mark being taken up by said optical system and each and any image-rotation appearing within said movable arm being counter-balanced by means provided for in the said stationary part of the visual system.

3. A plotting apparatus according to claim 1 in combination with a movable arm containing a variable optical system, a stationary optical mark in the stationary part of said visual system, means for counter-balancing any image-rotation appearing within said movable arm, said arm consisting of two parts, one of said parts swinging about an axis perpendicular to the appurtenant image-plane, and containing a second axis parallel to the first, the other of said parts swinging about said second axis and the free end of said second part being connected with the free end of the image space guide by way of an articulated joint.

4. A plotting apparatus according to claim 1, said movable arm containing a variable optical system, an optical mark in the stationary part of said visual system, means for counter-balancing any image-rotation appearing within said movable arm, said movable arm swinging about an axis perpendicular to the appurtenant image-plane, said optical system having over a certain length a parallel path of rays, said certain length being variable in a measure corresponding to the size of the image and said parallel path of rays serving the purpose of smoothing out the differences of depth between the various parts of the stereoscopic model and said stationary optical mark.

5. A plotting apparatus according to claim 1, the path of rays in the stationary part of the visual system being influenced by reflective means in such a way that it strikes a mirror positioned in the pole of the image space guide, said mirror remaining stationary during the length of a plotting operation.

6. A plotting apparatus according to claim 1, optical reflective means in the path of rays of the stationary part of the visual system, a mirror located in the pole of the image space guide and said mirror deflecting the rays into the hollow axle of tilt from where the rays pass into the eyepiece.

7. A plotting apparatus according to claim 1, the plate carriers being adapted as multiple-plate carriers, an individual movable arm for each picture, coupling means for connecting said arms to the common image space guide, optical reflective means for influencing the paths of rays in all visual systems of a multiple-plate carrier in such a way that they strike one mirror, said mirror being located in the pole of the common image space guide and remaining stationary during the plotting and means for pointing said mirror onto the various single and individual plates.

8. A plotting apparatus according to claim 1 possessing a common axis of tilt, the axes of swing of the plate carriers being arranged in planes perpendicular to said common axis of tilt, an axle embodying the axis of convergence, swing-bows for the plate carriers, said axis of convergence being at right angles to said axis of swing, each swing-bow containing the bearings for said axle of convergence, means for rotating the corresponding plate carriers into convergence in such a way that the axes of convergence and of swing intersect in one point situated on the common axis of tilt.

9. A plotting apparatus according to claim 1 with a common axis of tilt, the axes of swing of the plate carriers being in planes perpendicular to said axis of tilt, an axle embodying the axis of convergence at right angles to said axis of swing, swing-bows for the plate carriers, bearings for the rotative mounting of said axle of convergence, each of said swing-bows containing the said bearings, means for bringing corresponding plate carriers into convergence and said axis of tilt being adjustable about two axes lying at right angles to each other, one axis of which—the main axis—being in rigid connection with the main frame of the apparatus.

10. A plotting apparatus according to claim 1 with a common axis of tilt, the axles on which the plate carriers swing being in planes perpendicular to said axis of tilt, an axle embodying the axis of convergence at right angles to said axes of swing, swing-bows for the plate carriers, each of said swing-bows containing the bearings for the rotative mounting of said axle of convergence, means for bringing corresponding plate carriers into convergence, said axis of tilt being rotatively adjustable about two axes lying at right angles to each other, one axis of which—being embodied in the main axle—being connected to a bridge in the form of a hanging-axis, said bridge being bow-shaped in plan and extending at right angles to the direction of view.

11. A plotting apparatus according to claim 1 with a common axis of tilt, the axes of swing of the plate carriers being arranged in planes perpendicular to said axis of tilt, an axle embodying the axis of convergence, swing-bows for rotating the plate carriers into their correct relative position of swing, said axis of convergence being at right angles to said axes of swing, bearings for said axle of convergence being mounted on each said swing-bow, means for rotating the corresponding plate carriers into convergence relative to each other in such a way that the axis of convergence and of swing intersect in a point lying in the common axis of tilt, tilt-levers of such a form and arrangement that they are capable of being mounted on said axis of tilt clasping each other cross-wise, each of said tilt-levers containing two bearings for the appurtenant axis of swing between which the plate carriers are situated.

12. A plotting apparatus according to claim 1, in combination with a set of interchangeable lenses to be individually introduced into the optical system of the movable arm, said lenses being replaceable inter se so as to make the production of images of different scales possible at the place of the stationary optical mark of the visual system.

HEINRICH WILD.